United States Patent
Triesenberg, III et al.

(10) Patent No.: US 9,499,346 B2
(45) Date of Patent: Nov. 22, 2016

(54) DISTRIBUTED SORTER DRIVE USING ELECTRO-ADHESION

(71) Applicant: Dematic Corp., Grand Rapids, MI (US)

(72) Inventors: Thomas H. Triesenberg, III, Rockford, MI (US); Nolan R. Pilarz, Walker, MI (US); Dennis J. Schuitema, Ada, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 14/703,965

(22) Filed: May 5, 2015

(65) Prior Publication Data

US 2015/0329294 A1 Nov. 19, 2015

Related U.S. Application Data

(60) Provisional application No. 61/993,605, filed on May 15, 2014.

(51) Int. Cl.

| | |
|---|---|
| *B65G 47/92* | (2006.01) |
| *B65G 23/14* | (2006.01) |
| *B65G 17/34* | (2006.01) |
| *B65G 17/08* | (2006.01) |
| *B65G 23/00* | (2006.01) |
| *B65G 47/46* | (2006.01) |

(52) U.S. Cl.
CPC ............ *B65G 23/14* (2013.01); *B65G 17/08* (2013.01); *B65G 17/345* (2013.01); *B65G 23/00* (2013.01); *B65G 47/46* (2013.01)

(58) Field of Classification Search
CPC ...................................................... B65H 5/004
USPC ......... 198/370.01, 370.06, 370.1, 690.1, 691
See application file for complete search history.

(56) References Cited

U.S. PATENT DOCUMENTS

| | | |
|---|---|---|
| 3,157,330 A | 11/1964 | Manor et al. |
| 4,461,378 A | 7/1984 | Roth |
| 5,433,311 A | 7/1995 | Bonnet |
| 5,588,520 A | 12/1996 | Affaticati et al. |

(Continued)

FOREIGN PATENT DOCUMENTS

WO 2013166324 A2 11/2013

OTHER PUBLICATIONS

International Search Report and Written Opinion of the International Searching Authority from corresponding Patent Cooperation Treaty (PCT) Application No. PCT/US2015/029150, mailed Aug. 5, 2015.

(Continued)

*Primary Examiner* — Gene Crawford
*Assistant Examiner* — Lester Rushin
(74) *Attorney, Agent, or Firm* — Gardner, Linn, Burkhart & Flory, LLP

(57) ABSTRACT

A sorter drive for propelling travelling members of a sorter along a path, in which the sorter has a plurality of interconnected travelling members that travel along a path and sortation members carried by the travelling members, with the sortation members adapted to discharge articles to particular destinations, according to an aspect of the invention, includes an endless drive member and an electro-adhesion system. The endless drive member engages the travelling members. The electro-adhesion system increases attraction of the endless drive member and the travelling members.

27 Claims, 2 Drawing Sheets

(56) References Cited

U.S. PATENT DOCUMENTS

| | | | |
|---|---|---|---|
| 5,839,566 A | 11/1998 | Bonnet | |
| 6,264,042 B1 | 7/2001 | Cossey, Jr. et al. | |
| 6,609,607 B2 | 8/2003 | Woltjer et al. | |
| 6,669,001 B1 * | 12/2003 | Bromley | B65G 17/345 198/370.02 |
| 6,814,216 B2 | 11/2004 | Veit et al. | |
| 6,860,383 B2 | 3/2005 | Veit et al. | |
| 6,866,136 B2 | 3/2005 | Veit et al. | |
| 6,951,274 B2 * | 10/2005 | Zeitler | B65G 47/52 198/370.02 |
| 7,086,519 B2 | 8/2006 | Veit et al. | |
| 7,117,988 B2 | 10/2006 | Veit et al. | |
| 7,513,356 B2 | 4/2009 | Veit et al. | |
| 7,551,419 B2 | 6/2009 | Pelrine et al. | |
| 7,553,119 B2 | 6/2009 | Good et al. | |
| 7,773,363 B2 | 8/2010 | Pelrine et al. | |
| 7,798,306 B2 | 9/2010 | Brayman et al. | |
| 8,125,758 B2 | 2/2012 | Pelrine et al. | |
| 8,325,458 B2 | 12/2012 | Prahlad et al. | |
| 8,564,926 B2 | 10/2013 | Prahlad et al. | |
| 8,665,578 B2 | 3/2014 | Pelrine et al. | |
| 8,813,943 B2 | 8/2014 | Ramankutty et al. | |
| 9,093,926 B2 | 7/2015 | Prahlad et al. | |
| 2001/0030102 A1 | 10/2001 | Woltjer et al. | |
| 2007/0007108 A1 | 1/2007 | Veit et al. | |
| 2013/0294875 A1 * | 11/2013 | Prahlad | B25J 15/0085 414/730 |
| 2014/0014468 A1 | 1/2014 | Pilarz et al. | |

OTHER PUBLICATIONS

Commonly assigned U.S. Appl. No. 14/734,645, filed Jun. 9, 2015, entitled Linear Cross Belt Sorter Using Electro-Adhesion.

* cited by examiner

DISTRIBUTED SORTER DRIVE USING ELECTRO-ADHESION

CROSS REFERENCE TO RELATED APPLICATION

This application claims priority from U.S. patent application Ser. No. 61/993,605, filed on May 15, 2014, the disclosure of which is hereby incorporated herein by reference.

BACKGROUND OF THE INVENTION

The present invention is directed to a drive for a sorter and, in particular, to a distributed drive that is positioned along the conveying path. The invention may be used with various types of sorters, including, by way of example, a positive displacement sorter, such as a shoe and slat sorter, and a carrousel sorter, such as a crossbelt sorter or a tilt-tray sorter.

A unique sorter drive system is disclosed in commonly assigned U.S. Pat. No. 8,813,943 entitled "Positive Displacement Sorter" in which distributed drives in the form of endless belts apply force to the undersides of the sorter slats to propel the endless web of slats.

SUMMARY OF THE INVENTION

The present invention involves a recognition that significant upward force of the belt is required against the slats in the embodiments of the '943 patent, thus resulting in noise, wear, and the like. While the use of lugs or cleats on the belt reduces the need for such upward force, tight tolerances are required to maintain alignment between the belt and the slats. Wear in the system causes the tolerances to be exceeded.

A sorter drive for propelling travelling members of a sorter along a path, and resulting sorter, in which the sorter has a plurality of interconnected travelling members that travel along a path and sortation members carried by the travelling members, with the sortation members adapted to discharge articles to particular destinations, according to an aspect of the invention, includes an endless drive member and an electro-adhesion system. The endless drive member engages the travelling members. The electro-adhesion system increases attraction of the endless drive member and the travelling members. The electro-adhesion allows increased thrust force that the endless drive member can induce on the travelling members and, thus, reduces the force required against the travelling members to achieve thrust in the travelling members. This can be achieved without the use of lugs or cleats on the endless drive member.

The travelling members may include a plurality of slats and the sortation members pushers that travel along the slats to divert articles from a conveying surface. The slats are connected in an endless web having an upper portion that defines the conveying surface and a return portion. The endless drive engages a lower surface of the upper portion or an upper surface of the lower portion. The sorter slats may be metallic.

The travelling members may be interconnected carriages and the sortation members cross belts or tilting surfaces supported by the carriages. The carriages travel generally horizontally in a closed loop for receiving articles to the sortation members from inducts and discharge articles laterally to destinations. The endless drive engages a lower surface of the carriages.

The endless drive member may be a belt. A plurality of drives may be distributed along said path. The electro-adhesion system may energize the entire endless member in a single zone of energization. The electro-adhesion system may substantially constantly energize the entire said endless member thereby providing said single zone.

These and other objects, advantages and features of this invention will become apparent upon review of the following specification in conjunction with the drawings.

DESCRIPTION OF THE PREFERRED EMBODIMENT

Figure 1:
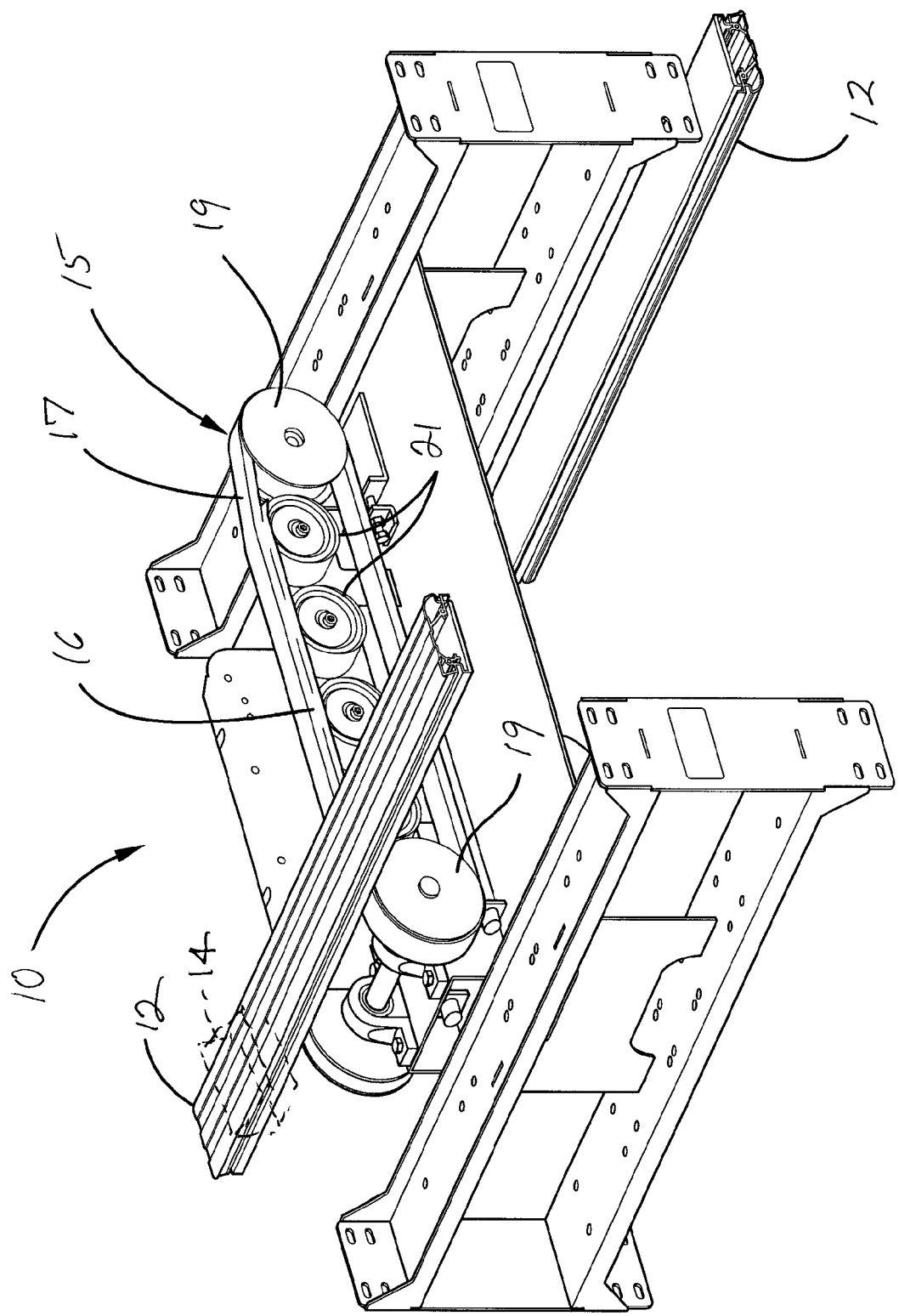
FIG. 1 is a perspective view of a sorter, according to an embodiment of the invention.
Figure 2:
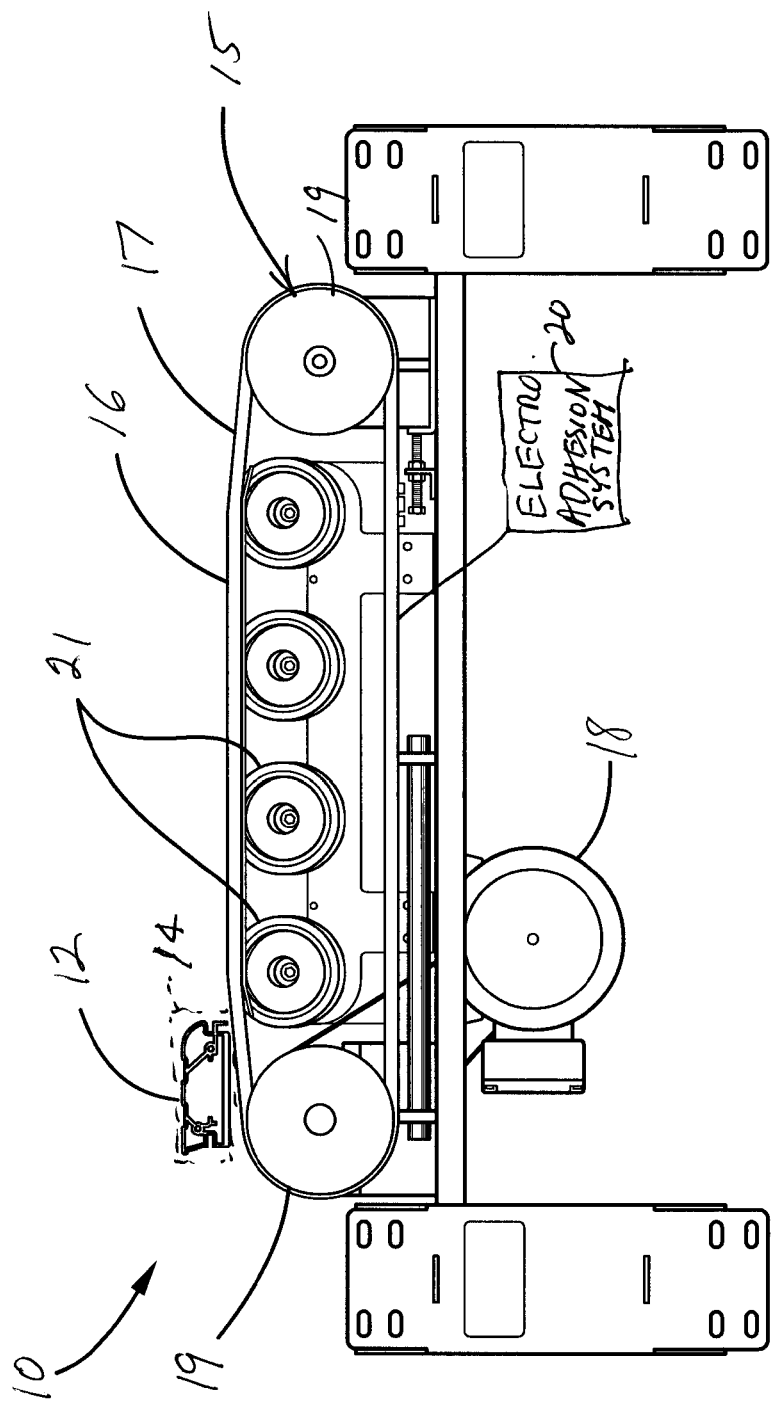
FIG. 2 is a side elevation view of the sorter in claim 1.

Referring now to the drawings and the illustrative embodiment depicted therein, a sorter 10 includes a plurality of interconnected travelling members 12 that are interconnected in a web and travel along a path. Only two travelling members 12 are shown in FIG. 1, one in an upper run of the web and one in a lower run of the web. Sorter 10 further includes a plurality of sortation members 14 that are carried by travelling members. The sortation members discharge articles carried on travelling members to particular destinations in order to sort the articles. Sorter 10 further includes a drive 15 that is adapted to propel travelling members 12 along a path. Drive 15 includes an endless drive member 16 engaging some of the travelling members 12 at any one time and an electric motor 18 to propel the endless drive member. In the illustrated embodiment, endless drive member 16 is reeved about end pulleys 19 and support pulleys or surface 21. In the illustrated embodiment, travelling members 12 are a plurality of slats and sortation members 14 are pushers that travel along the slats to divert articles from a conveying surface. In such an embodiment, the slats are connected in an endless web having an upper portion that defines the conveying surface and a return portion, with the endless drive member engaging a lower surface of the upper run or an upper surface of the lower run, or both the upper and lower run with each drive member. Additional details of such sorter are disclosed in commonly assigned U.S. Pat. No. 8,813,943 entitled "Positive Displacement Sorter," the disclosure of which is hereby incorporated herein by reference.

Sorter 10 further includes an electro-adhesion system 20 connected with endless member 16. Electro-adhesion system 20 increases attraction between endless drive member 16 and those travelling members 12 that are in contact with the drive member. Such electro-adhesion system is of the type marketed by Grabit, Inc. and is described in more detail in U.S. Pat. Nos. 7,551,419; 7,773,363; 8,125,758; 8,325,458; 8,564,926; and 8,665,578, the disclosures of which are hereby collectively incorporated herein by reference in their entirety.

In the illustrated embodiment, electro-adhesion system 20 energizes the entire endless member 16 in a single zone of energization. This may be accomplished, for example, by ohmic, or inductive, coupling of system 20 to the endless member 16 or one of its support pulleys. The use of a single zone is possible because the attraction force between endless member 16 is strongest in both the shear direction in which the endless member is propelling the travelling members 12 as well as in the direction of attraction between the travelling members and the endless member. However, the "peel" force attraction is significantly reduced. This allows endless member 16 to strongly attract the travelling members 12 and propel the travelling members, but to pull away from the travelling members as a given section 17 of the endless member is at the end of the drive and travels around an end pulley 19. Because of this arrangement, the attraction force between an endless member and the travelling members and the shear force tending to propel the travelling members is sufficient to overcome the counter-action of the peel force required to break contact between the endless member and the travelling members. As a result, the attraction between the endless member 16 and travelling members 12 can be continuous and constant so that the motion of the endless member 16 is transferred to the travelling members 12 to propel the sorter conveying surface and the articles carried by the conveying surface for sortation. Of course, it would be possible to divide endless member 16 into a plurality of separate zones of energization with a commutator between the electro-adhesion system 20 and the separate zones of the endless member. In this manner, as a zone of the endless member is in contact with one of the travelling members, it is energized to apply a force propelling the travelling member and when that zone is at the end of contact with the travelling member it can be de-energized in order to break contact with the travelling members as it travels around an end pulley of drive 15.

In the illustrated embodiment, travelling members are metallic slats. However, electro-adhesion system 20 will still attract the travelling members if they are made from a non-metallic material. Also, endless drive member 16 is a polymeric belt, although other configurations are possible. Also, a plurality of said drives 16 may be distributed along the path of the sorter as disclosed in the '943 patent.

In an alternative embodiment, the travelling members may be interconnected carriages, such as of the type disclosed in commonly assigned U.S. Pat. No. 5,588,520 and United States Patent Application Publication No. 2014/0014468 A1, the disclosures of which are hereby incorporated herein by reference. In such embodiment, the sortation members comprise cross belts of the type disclosed in the '520 patent or may be a tilting surface of the type well known in the art that are supported by the carriages. The carriages travel generally horizontally on wheels in a closed loop for receiving articles to the sortation members from inducts and discharging articles laterally to destinations, such as chutes, or the like. In such embodiment, the endless drive engages a lower surface of said carriages.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A sorter, comprising
   a plurality of interconnected travelling members that travel along a path;
   sortation members carried by said travelling members, said sortation members adapted to discharge articles to particular destinations; and
   a drive that is adapted to propel said travelling members along said path, said drive comprising an endless drive member engaging said travelling members, a motor to propel said endless drive member and an electro-adhesion system connected with said endless drive members in order to drive said interconnected travelling members with electro-adhesion, said electro-adhesion system energizes the endless drive member to increase attraction of said endless drive member and said travelling members through electro-adhesion in order to provide sufficient force between said endless drive member and said travelling members in a sheer direction to propel the travelling members with the endless drive member.

2. The sorter as claimed in claim 1 wherein said travelling members comprise a plurality of slats and said sortation members comprise pushers that travel along said slats to divert articles from a conveying surface, said slats connected in an endless web having an upper portion that defines said conveying surface and a return portion, said endless drive engaging a lower surface of said upper portion or an upper surface of said lower portion.

3. The sorter as claimed in claim 2 wherein said slats are metallic.

4. The sorter as claimed in claim 1 wherein said travelling members comprise interconnected carriages and said sortation members comprise cross belts or tilting surfaces supported by said carriages, said carriages travelling generally horizontally in a closed loop for receiving articles to said sortation members from inducts and discharging articles laterally to destinations, said endless drive engaging a lower surface of said carriages.

5. The sorter as claimed in claim 4 wherein said endless drive member comprises a belt.

6. The sorter as claimed in claim 3 wherein said endless drive member comprises a belt.

7. The sorter as claimed in claim 2 wherein said endless drive member comprises a belt.

8. The sorter as claimed in claim 1 wherein said endless drive member comprises a belt.

9. The sorter as claimed in claim 8 including a plurality of said drives distributed along said path.

10. The sorter as claimed in claim 4 including a plurality of said drives distributed along said path.

11. The sorter as claimed in claim 3 including a plurality of said drives distributed along said path.

12. The sorter as claimed in claim 2 including a plurality of said drives distributed along said path.

13. The sorter as claimed in claim 1 including a plurality of said drives distributed along said path.

14. The sorter as claimed in claim 13 wherein said electro-adhesion system energizes the entire said endless member in a single zone of energization.

15. The sorter as claimed in claim 14 wherein said electro-adhesion system substantially constantly energizes the entire said endless member thereby providing said single zone.

16. The sorter as claimed in claim 9 wherein said electro-adhesion system energizes the entire said endless member in a single zone of energization.

17. The sorter as claimed in claim 16 wherein said electro-adhesion system substantially constantly energizes the entire said endless member thereby providing said single zone.

18. The sorter as claimed in claim 4 wherein said electro-adhesion system energizes the entire said endless member in a single zone of energization.

19. The sorter as claimed in claim 18 wherein said electro-adhesion system substantially constantly energizes the entire said endless member thereby providing said single zone.

20. The sorter as claimed in claim 1 wherein said electro-adhesion system energizes the entire said endless member in a single zone of energization.

21. The sorter as claimed in claim 20 wherein said electro-adhesion system substantially constantly energizes the entire said endless member thereby providing said single zone.

22. A sorter drive for propelling travelling members of a sorter along a path, said sorter having a plurality of interconnected travelling members that travel along a path and sortation members carried by said travelling members, said sortation members adapted to discharge articles to particular destinations, said drive comprising:
   an endless drive member that is adapted to engage said travelling members, a motor to propel said endless drive member and an electro-adhesion system connected with said endless drive member in order to drive said interconnected travelling members with electro-adhesion; and
   said electro-adhesion system energizes the endless drive member to increase attraction of said endless drive member and said travelling members through electro-adhesion in order to provide sufficient force between said endless drive member and said travelling members in a sheer direction to propel the travelling members with the endless drive member.

23. The sorter drive as claimed in claim 22 wherein said endless drive member comprises a belt.

24. The sorter drive as claimed in claim 23 wherein said electro-adhesion system energizes the entire said endless member in a single zone of energization.

25. The sorter drive as claimed in claim 24 wherein said electro-adhesion system substantially constantly energizes the entire said endless member thereby providing said single zone.

26. The sorter drive as claimed in claim 22 wherein said electro-adhesion system energizes the entire said endless member in a single zone of energization.

27. The sorter drive as claimed in claim 26 wherein said electro-adhesion system substantially constantly energizes the entire said endless member thereby providing said single zone.

* * * * *